Jan. 30, 1968 C. B. HEFFRON 3,366,807
FAIL-SAFE SCANNING CIRCUITS EMPLOYING SEMICONDUCTIVE SWITCH IN ANODE-GATE CIRCUIT OF THREE-ELECTRODE THRESHOLD SWITCH FOR PROTECTION THEREOF
Filed Nov. 27, 1964
2 Sheets-Sheet 1

INVENTOR
Charles B. Heffron
BY

United States Patent Office 3,366,807

Patented Jan. 30, 1968

3,366,807

FAIL-SAFE SCANNING CIRCUITS EMPLOYING SEMICONDUCTIVE SWITCH IN ANODE-GATE CIRCUIT OF THREE-ELECTRODE THRESHOLD SWITCH FOR PROTECTION THEREOF

Charles B. Heffron, Metuchen, N.J., assignor to Westinghouse Electric Corporation, East Pittsburgh, Pa., a corporation of Pennsylvania Filed Nov. 27, 1964, Ser. No. 414,213
7 Claims. (Cl. 307—284)

The present invention relates to scanning circuits, and more particularly to scanning circuits using semiconductor switching devices and having incorporated therein a fail-safe feature.

The use of semiconductor switching devices as controlled rectifiers in the horizontal scanning circuit of a television receiver provides many advantages including very low conducting impedance, long life and dependability in comparison to thermionic devices presently being used. The use of a conventional silicon controlled rectifier and a controlled rectifier having a turn-off characteristic have been suggested for use in a horizontal scanning circuit. See, for example, copending application Ser. No. 394,111, filed Sept. 3, 1964, now abandoned, by C. B. Heffron, and being assigned to the assignee of the present application. The use of such semiconductor switches, however, presents a problem of device failure if the forward anode-cathode breakover voltage is exceeded. The large current flow in the breakover avalanche region of the device may cause serious damage to the device.

If a controlled rectifier is to be used in the horizontal scanning circuit of a typical television receiver, the controlled rectifier must be capable of blocking an applied scan retrace voltage which approaches 80 to 90% of its maximum forward rated breakover voltage. The controlled rectifier is normally in its non-conducting turned-off state during the retrace interval of the horizontal scan cycle. Various factors can cause the retrace voltage to approach and actually exceed the forward breakover voltage of the controlled rectifier. For example, a critical operating condition may result if the horizontal oscillator driving the controlled rectifier operates at a frequency lower than desired. Under this condition the conducting turned-on period of the controlled rectifier is longer than normal; thus, more energy than normal is stored in the associated circuit inductance. The result of this is that when the device is turned off a substantially larger than normal retrace voltage is applied across the device which can exceed the breakover voltage. Another mechanism by which excessive retrace voltages may be generated is by arcing or the heavy loading of the high voltage supply of the receiver. The heavy loading causes the conduction time of the controlled rectifier to be increased. At the instant of unloading, when the device is turned off, retrace voltage can exceed the breakover value of the device causing serious damage.

It is, therefore, an object of the present invention to provide a new and improved scanning circuit having a fail-safe feature.

It is a further object of the present invention to provide a new and improved horizontal scanning circuit for use in a television receiver which includes a semiconductor switching device which is protected against failure.

It is a still further object of the present invention to provide a new and improved horizontal scanning circuit for use in a television receiver which utilizes a controlled rectifier which is protected from failure by a device responsive to excessive voltages appearing across the controlled rectifier.

Broadly, the above cited objects are accomplished by providing a scanning circuit including a semiconductor device wherein: when an excessive voltage, approaching the breakover value of the device, is applied across the controlled rectifier device, a signal is applied to the controlled device to reduce the voltage thereacross.

Further objects and advantages of the present invention will become more apparent when considered in view of the following specification and drawings in which:

FIG. 2 is a waveform diagram including curves A, B and C used in explaining the operation of FIG. 1 and in which:

Curve A is the waveform of the gate signal voltage to be applied to the gate electrode of the controlled switch.

Figure 3:
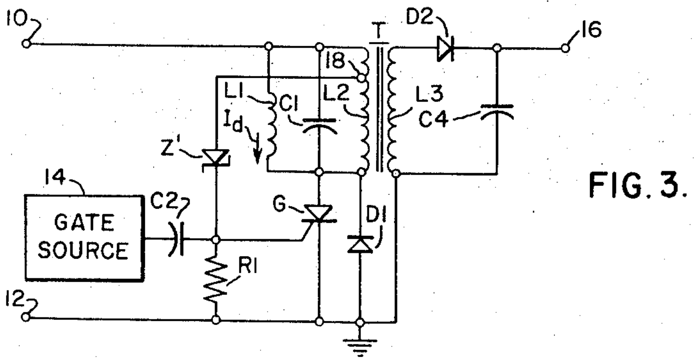
Figure 4:
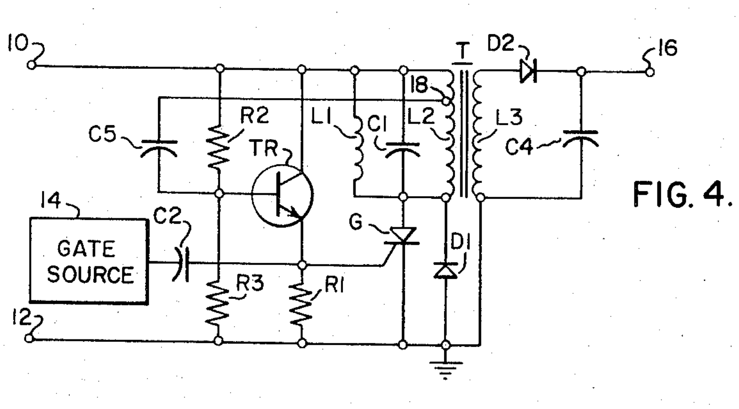
Figure 5:
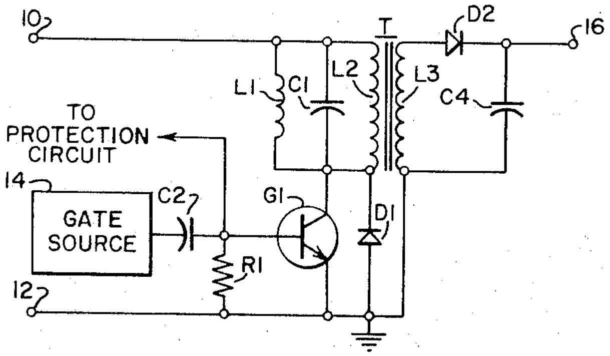

Curve B is the waveform of the deflection current passing through the deflection yoke, and Curve C is a waveform of the anode to cathode voltage of the controlled switch;

FIG. 3 is a schematic diagram of another embodiment of the present invention;

FIG. 4 is a schematic diagram of another embodiment of the present invention; and FIG. 5 is a schematic diagram of another embodiment of the present invention.

A semiconductor device, such as the controlled rectifier with or without a turn-off characteristic or a transistor, is capable of switching large surge currents provided by circuit capacitance if turned-on by a signal to the control gate or base of the device. However, if the same capacitor energy is allowed to discharge through the device when anode-cathode breakover occurs, failure of the device usually will result from excessively high avalanche currents passing therethrough. This results even though the time required for discharge in the avalanche mode is less than normal since the discharge current is much higher creating a damagingly high $I^2t$ product, where I is the current flowing in the device and $t$ is the period of current flow. A fail-safe scanning circuit can be provided by utilizing the concept of turning on the controlled device when excessive voltages are applied thereto as will be explained in the following specific description.

Figure 1:
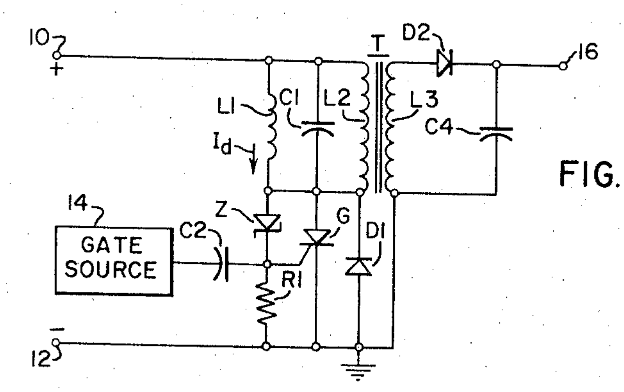
FIGURE 1 is a schematic diagram of one embodiment of the present invention.

Reference is now made to FIG. 1 in which a scanning circuit is shown wherein the controlled rectifier device G is protected by applying a turn-on signal to the gate electrode thereof when the breakover voltage of the device is approached. The controlled rectifier G may be a regular silicon controlled-rectifier (SCR) or may be a controlled rectifier having a gate turn-off characteristic, commonly called a gate controlled switch (GCS). Several of the embodiments described herein will be discussed with reference to a device having a gate turn-off characteristic. However, it should be understood that a regular SCR, transistor or other semiconductor switching device could easily be incorporated into the teachings of the present invention.

The circuit of FIG. 1 may be used as the horizontal scanning circuit of a television receiver. A source of direct potential, not shown, is connected across a pair of terminals 10 and 12 with the terminal 10 having a positive polarity. A deflection coil L1 is connected between the terminal 10 and the anode electrode of the gate controlled switch G. The cathode electrode of the gate controlled switch G is connected at the terminal 12, which may be grounded. A resonating capacitor C1 is connected across the deflection yoke L1. A diode D1 is connected across the anode-cathode of the switch G in reverse polarity thereto.

Figure 2:
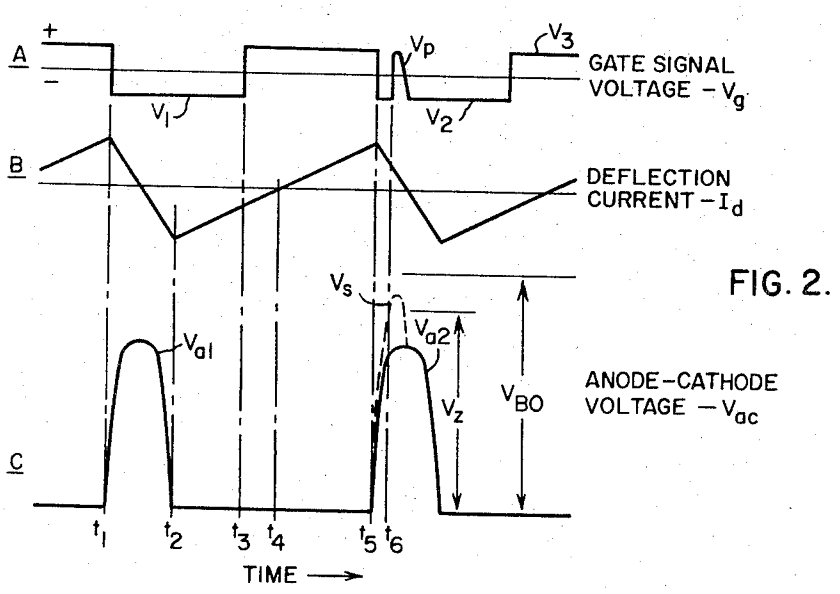

Referring to FIG. 2, at the time $t_1$, a turn-off pulse $V_1$, see curve A, is applied to the gate electrode of the switch G. The turn-off pulse is supplied by a gate source 14 which has an output which may be as shown as in curve A as a square wave having positive and negative polarities, the negative polarity being the turn-off pulse. The output of the gate source 14 is applied to the gate electrode of the switch G through capacitor C2. The retrace portion of the scanning cycle continues until the time $t_2$, there being a linearly decreasing deflection current $I_d$, as shown in curve B. The anode-cathode retrace voltage is shown by curve C, the waveform $V_{a1}$ appearing during the time $t_2-t_1$.

The resonating capacitor C1 is chosen to have a capacitance value such as to determine the retrace resonant frequency of the scanning current $I_d$ generated in the deflection coil L1. At the beginning of the retrace interval, the gate controlled switch G is turned-off and the large positive current stored in the circuit inductance flows into the capacitor C1 charging it to the peak of the retrace voltage. At this time the yoke current $I_d$ has reached its zero value. The resonant retrace continues with the yoke current $I_d$ increasing to its negative peak with the capacitor C1 discharging to zero voltage. As the resonance attempts to continue, the capacitor C1 charges to just enough more than the D.C. source voltage so as to forward bias the diode D1. The capacitor voltage is now clamped to this value and the larger negative yoke current begins its linear discharge towards zero.

At the time $t_4$ the gate controlled switch G is rendered conductive by the application of a gate signal thereto, see curve A. The positive gate signal was applied at time $t_3$, somewhat before the time $t_4$, in order to account for any losses resulting in the circuit and to insure turn-on of the device G at the time $t_4$. At the time $t_4$, the deflection current $I_d$ becomes positive and increases in the positive direction with the gate controlled switch G conducting until the time $t_5$ at the end of the trace and beginning of the retrace cycle of the deflection circuit.

An output transformer T is provided having a primary winding L2 connected across the parallel combination of the deflection yoke L1 and the resonating capacitor C1. The transformer T has a secondary high voltage winding L3 with one end connected in series with a high voltage rectifier D2 to supply a high voltage output at a terminal 16, which may be used to supply the cathode ray tube of the television received. A storage capacitor C4 is connected to the anode of the rectifier D2 to ground.

In order to protect against an excessive anode the cathode voltage appearing across switch G during the retrace portion of the scanning cycle, a breakdown semi-conductor device Z is connected between the anode and gate electrodes of the device G. A resistor R1 is connected between the gate and cathode electrodes of the switch G to complete the circuit to ground and control the current level of the breakdown device. The device Z may, for example, be a Zener diode, but, of course, may also include any device which is voltage responsive to breakdown and provide a low impedance path thereacross if a voltage exceeding a predetermined value is applied thereacross. For example, the Zener diode could be replaced by a fast switching voltage regulator tube.

Referring back now again to FIG. 2, at the time $t_5$, the retrace portion of the scanning cycle begins again with the gate controlled switch G being turned-off by the application of a negative polarity gate pulse thereto. The deflection current $I_d$ begins to linearly decrease as described above. As shown in curve C, an anode to cathode voltage $V_{a2}$ will appear across the switch G. To show the operation of the fail safe feature of the present invention, suppose at the time $t_6$, sometime during the retrace portion of the scan cycle, and that the voltage appearing across the anode to cathode of the controlled rectifier G increases as shown by the dotted curve $V_s$. The dotted curve $V_s$ is shown to increase above the breakover level of the Zener diode Z which has a breakover voltage of $V_z$ as indicated in curve C. The breakover voltage $V_z$ is designed to be somewhat less than the breakover voltage $V_{BO}$ of the gate controlled switch G as also shown in curve C. When the voltage $V_s$ exceeds the breakdown voltage $V_z$ of the Zener diode Z, the diode Z will breakdown and permit current readily to flow therethrough. As the Zener diode Z is connected between the anode and gate electrodes of the switch G, a turn-on signal having a positive polarity will be applied to the gate electrode of the gate controlled switch G. The waveform of the signal is shown as the pulse $V_p$ in FIG. A. Thus, a portion of the retrace voltage is applied to the gate of the controlled rectifier G. Applying the signal $V_p$ to the gate will cause the gate controlled switch G to be rendered conductive to discharge sufficient circuit energy so as to clamp the anode-cathode voltage of the gate controlled switch to the Zener breakdown potential. After the feedback pulse $V_p$ has been removed from the gate electrode, the switch G will then be turned-off because of the negative polarity signal $V_2$ provided by the gate source 14. It can then be seen by gating the gate controlled switch on before the voltage thereacross has reached a dangerous value $V_{BO}$ it is prevented from breaking over into its avalanche region to avoid the possibility of damaging the device. The retrace period continues after the removal of $V_p$ and the normal scan cycle repeats.

The Zener breakdown or breakover voltage $V_z$ is selected to be higher than the usual highest value of anode retrace voltage and somewhat lower than the breakover voltage $V_{BO}$ of the controlled switch G. Therefore, when the retrace voltage exceeds this normal value to the extent of exceeding the breakdown value $V_z$ of the Zener diode, a portion of the retrace voltage as shown by the pulse $V_p$ is fed back to the gate electrode of the controlled switch G when the breakdown of the Zener occurs. This turns on the gate controlled switch G clamping anode to cathode voltage substantially to the Zener voltage which prevents the switch G from breaking over into its avalanche region. The controlled switch is turned-off again as soon as the excessive voltage is removed from its anode electrode with the retrace portion of the scanning cycle continuing as normal again.

The circuit of FIG. 3 shows a horizontal scanning circuit which permits the use of a lower voltage Zener diode Z′. FIG. 3 is identical with FIG. 1 except that instead of connecting the Zener diode directly between the anode and gate electrodes of the gate controlled switch G a tap 18 is provided on the primary winding L2 of the transformer T on this connection. Then Zener diode Z′ is connected between the tap 18 and the gate electrode of the gate controlled switch G. A lower voltage Zener diode Z′ can be used since the voltage at the tap 18 on the primary winding L2 will be lower than that on the anode electrode of the controlled rectifier G during the retrace cycle. However, the voltages at the anode and at the tap 18 will track each other and when the voltage at the anode exceeds a predetermined value the Zener diode Z′ may be so selected that the voltage at the tap 18 correspondingly will cause the Zener diode Z′ to breakover and thus apply a gating turn-on signal to the gate electrode of the gate controlled switch G. The operation of the circuit of FIG. 3 is otherwise the same as that of FIG. 1.

FIG. 4 shows another embodiment of the present invention in which a transistor TR is operative in a switching mode to provide the gating signal to the gate controlled switch G whenever an excessive voltage condition exists at the anode of the gate controlled switch G. The circuit differs only from FIG. 3 in that the tap 18 is connected through a capacitor C5 to the base electrode of the transistor TR. The transistor TR is biased through a voltage divider including the resistors R2 and R3 connected in series between the terminals 10 and 12. The base of the transistor TR is connected at the point between the resistors R2 and R3. The collector of the transistor TR is connected to the positive terminal 10 while the emitter is connected to the gate electrode of the gate controlled switch G. The resistor R1 completes the circuit from the emitter electrode to ground. The transistor TR is biased normally to its unconductive open circuit condition between its collector and emitter electrodes. However, the bias is so established that it will be switched to its conducting state when a signal is applied to its base corresponding to an excessive voltage appearing across the controlled device G. That is, if a voltage appears at the anode of the gate controlled switch G which approaches the breakover voltage $V_{BO}$ of the switch G, a switching voltage will be applied from the tap 18 through the capacitor C5 to the base of the transistor TR which will switch-on the transistor TR. With the transistor TR in its conducting condition, a positive gating signal will be applied to the gate electrode of the gate control switch G which will turn-on the gate controlled switch G reducing its anode voltage and removing the possible damaging condition. The operation of circuit 4 in other respects is substantially similar to the operation of FIGS. 1 and 3.

FIG. 5 shows another embodiment in which the controlled switch G is replaced with a transistor G1 operative in a switching mode. The transistor G1 has its collector electrode connected to the junction of the coil L1 and the capacitor C1, with the emitter electrode being provided. The base electrode is connected to the resistor R1 and is supplied from the gate source to be switched on thereby. The operation of FIG. 5 is substantially similar to that of FIGS. 1, 3 and 4. Any of the protection circuits described in these figures may be incorporated into FIG. 5.

The horizontal scanning circuit described in FIGS. 1, 3, 4 and 5 teach a novel combination in which if an excessive voltage appears across the anode-cathode circuit of semiconductor switch or which approaches its breakover value, a turn-on signal is fed back to the gate or control electrode thereof which instantaneously turns on the switch which reduces the anode voltage to a safe value and removes the dangerous condition. Various over voltage responsive devices can, of course, be used to sense the dangerous voltage condition at the anode of the controlled device above those described herein.

Although the present invention has been described with a certain degree of particularity, it should be understood that it has been made only by way of example and that numerous changes in the details of construction and the combination and arrangement of parts, elements and components may be resorted to without departing from the scope and spirit of the present invention.

I claim as my invention:

1. In a scanning circuit operative with a source of direct current the combination of: a first semiconductor switching device including a pair of output electrodes and a control electrode and having a predetermined breakover potential between said output electrodes, a parallel circuit combination of an inductance coil and a resonating capacitor connecting said one of said output electrodes of said first switching device to said source, a unidirectional device connected across said pair of output electrodes of said first switching device in reverse polarity thereto, control means operatively connected to said first switching device to turn-off said first switching device at predetermined times, and a second switching device operatively connected between said souce and said control electrode of said first switching device and being responsive to switch in reponse to the voltage between said output electrodes of said first switching device exceeding said breakover potential to render said first switching device conductive.

2. In a scanning circuit operative with a source of direct current the combination of: a transistor including a pair of output electrodes and a control electrode and having a predetermined breakover potential between said output electrodes, a parallel circuit combination of an inductance coil and a resonating capacitor connecting one of said output electrodes of said transistor to said source, a unidirectional device connected across said pair of output electrodes of said transistor in reverse polarity thereto, control means operatively connected to said control electrode of said transistor to turn-off said transistor at predetermined times, and a switching device operatively connected between said source and said control electrode of said transistor and being responsive to switch in response to the voltage between said output electrodes of said transistor exceeding said predetermined breakover potential to render said transistor conductive.

3. In a scanning circuit operative with a source of direct current the combination of: a gate controlled rectifier, including anode, cathode and gate electrodes, a parallel circuit combination of an inductance coil and a resonating capacitor connecting said controlled rectifier anode to said source, a diode connected between the anode and cathode electrodes of said controlled rectifier in reverse polarity thereto, control means operatively connected to said controlled rectifier to turn-off said controlled rectifier at predetermined times, and a Zener diode connected between the anode and gate electrodes of said controlled rectifier to breakdown and apply a signal to the gate electrode of said controlled rectifier when the voltage between said anode and cathode electrodes of said controlled rectifier exceeds a predetermined value and turn-on said controlled rectifier and thereby reduce the potential thereacross.

4. In a horizontal scanning circuit operative with a source of direct current and including an output transformer the combination of: a controlled rectifier including anode, cathode and gate electrodes and having a predetermined anode-cathode breakover potential, a parallel circuit combination of an inductance coil and a resonating capacitor connecting said controlled rectifier anode to said source, a unidirectional device connected across the anode and cathode of said controlled rectifier in reverse polarity thereto, control means operatively connected to said gate electrode of said controlled rectifier to turn-off said rectifier at predetermined times, and a breakdown device operatively connected between a tap on said high voltage transformer and said gate electrode of said controlled rectifier to breakdown and apply a turn-on signal to said controlled rectifier when the voltage across said controlled rectifier approaches said breakover potential of said controlled rectifier.

5. In a horizontal scanning circuit operative with a source of direct current and including an output transformer the combination of: a controlled rectifier including anode, cathode and gate electrodes and having a predetermined anode-cathode breakover potential, a parallel circuit combination of an inductance coil and a resonating capacitor connecting said controlled rectifier anode to said source, a diode connected between the anode and cathode electrodes of said controlled rectifier in reverse polarity thereto, control means operatively connected to said controlled rectifier to turn-off said rectifier at predetermined times, and a Zener diode connected between a tap on said high voltage transformer and the gate electrode of said controlled rectifier, said Zener diode being operative to breakdown and apply a turn-on signal to said controlled rectifier when the voltage across said controlled rectifier approaches the breakover potential of said controlled rectifier.

6. In a horizontal scanning circuit operative with a source of direct current and including an output transformer the combination of: a controlled rectifier including anode, cathode and gate electrodes and having a predetermined anode-cathode breakover potential, a parallel circuit combination of an inductance coil and a resonating capacitor connecting said controlled rectifier anode to said source, a diode connected across said controlled rectifier in reverse polarity thereto, control means operatively connected to said controlled rectifier to turn-off said rectifier at predetermined times, and a switching device operatively connected between said source and said gate electrode of said controlled rectifier and being responsive to switch in response to the voltage between said anode and cathode electrodes of said controlled rectifier exceeding said predetermined value to render said controlled rectifier conductive.

7. In a horizontal scanning circuit operative with a source of direct current and including an output transformer the combination of: a controlled rectifier including anode, cathode and gate electrodes and having a predetermined anode-cathode breakover potential, a parallel circuit combination of an inductance coil and a resonating capacitor connecting said controlled rectifier anode to said source, a diode connected between the anode and cathode electrodes of said controlled rectifier in reverse polarity thereto, control means operatively connected to said controlled rectifier to turn-off said rectifier at predetermined times, and a transistor having base, collector and emitter electrodes, said collector and emitter electrodes operatively connecting said source and the gate electrode of said controlled rectifier, the base electrode of said transistor being connected to a tap on said output transformer, with said transistor being operative to switch in response to the voltage across said controlled rectifier approaching said breakover potential of said controlled rectifier and to apply a turn-on signal to the gate electrode of said controlled rectifier to protect it against overvoltages.

References Cited

UNITED STATES PATENTS

| | | | |
|---|---|---|---|
| 2,814,736 | 11/1957 | Hamilton | 307—88.5 |
| 3,210,601 | 10/1965 | Walker | 315—27 |
| 3,210,605 | 10/1965 | Jones | 307—88.5 |
| 3,267,290 | 8/1966 | Diebold | 307—88.5 |

JOHN S. HEYMAN, *Primary Examiner.*

ARTHUR GAUSS, *Examiner.*